Nov. 20, 1934.  A. E. CALKINS  1,981,800

LIQUID LEVEL CONTROL DEVICE

Filed May 29, 1931

Inventor
Austin Earle Calkins

By W. E. Currie, Attorney

Patented Nov. 20, 1934

1,981,800

UNITED STATES PATENT OFFICE 1,981,800

LIQUID LEVEL CONTROL DEVICE

Austin Earle Calkins, Westfield, N. J., assignor to Standard Oil Development Company, a corporation of Delaware Application May 29, 1931, Serial No. 540,965

1 Claim. (Cl. 137—68)

This invention relates to improvements in means for controlling the level of non-miscible liquids of different densities. The invention will be fully understood from the following description taken in connection with the accompanying drawing in which latter—

Figure 2:
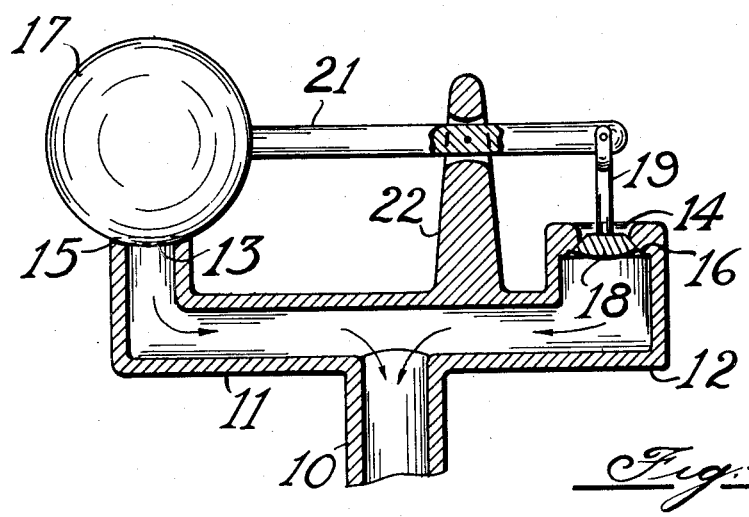
Figure 1:
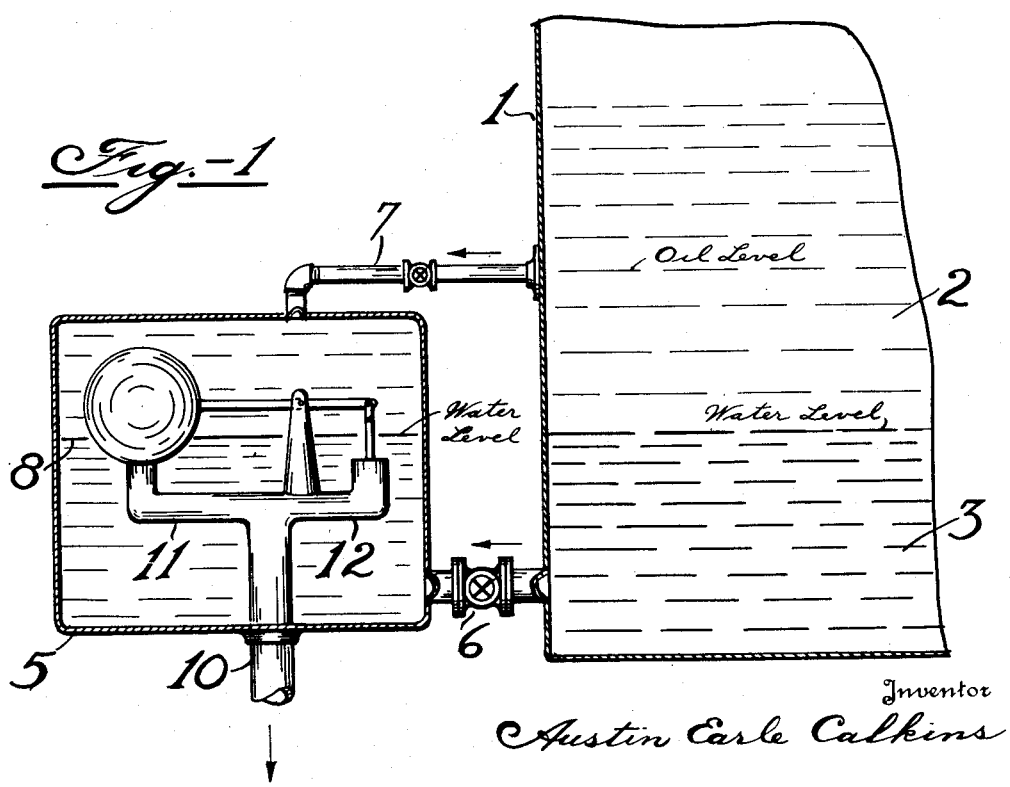

Fig. 1 is a transverse sectional view through a tank with a liquid level control device attached thereto, and Fig. 2 is a longitudinal sectional view through the operative mechanism of the liquid level control device.

Referring particularly to the drawing, reference numeral 1 designates a tank which is adapted to contain two non-miscible liquids of different densities such as hydrocarbon oil 2 and water 3. The liquid level control device includes a container 5, the lower portion of which communicates with the tank 1 through a valved line 6 below the normal level of water in tank 1. The upper portion of container 5 communicates with tank 1 through a valved line 7 above the normal level of water in tank 1. The water and oil therefore flow from tank 1 into container 5 through lines 6 and 7 respectively, and are disposed in container 5 in stratified position with the normal level of water at point 8.

A valve mechanism is disposed in container 5 for discharge of the water when its level rises in the tank. The valve mechanism includes a conduit 10 which delivers from container 5 to a suitable place of disposal, not shown. Conduit 10 is provided with branch conduits 11 and 12 having spaced upwardly facing inlet openings at 13 and 14. Opening 13 is provided with an upwardly facing valve seat 15 and opening 14 is provided with a downwardly facing valve seat 16. Openings 13 and 14 are normally closed by the valve assembly which includes a float valve 17 cooperating with opening 13 and a pressure release valve which includes a valve head 18 and a valve stem 19 cooperating with opening 14. Spaced portions in arm 21 are connected to float valve 17 and valve stem 19. An intermediate portion of the arm is pivotally supported by means of a lug 22 which extends upwardly from conduit 12. The valve assembly is so weighted that the float valve is buoyant in the water but is not buoyant in the oil.

Under normal conditions when the level of water within tank 1 and container 5 extends no higher than the line 8, the float valve rests upon its valve seat closing the opening 13 and maintains the pressure released valve closed against its seat 16 thereby preventing the escape of any liquid through the conduit. As the level of water rises in the container, it buoys up the float valve and the counter-pressure of the water on the pressure release valve further lifts the float valve to a position above its normal buoyant position in the water or to a position above the water and in the oil. Water is therefore released through the opening 13 and through the opening 14 and is discharged from the container. The discharge of water as described lowers the water level in the container and tank. As a consequence the float valve sinks in the container until it rests upon its valve seat preventing further discharge of water through conduit 11. At the same time the pressure release valve is raised into engagement with its valve seat closing opening 14 and preventing further escape of water through conduit 12.

While the device has been described as used for the purpose of withdrawing water from supernatant lighter liquid, such as oil, it will be understood that it can be used for withdrawing any relatively heavy liquid from any relatively light liquid which is nonmiscible therewith.

Various changes may be made within the scope of the appended claims in which it is desired to claim all novelty inherent in the invention as broadly as the prior art permits.

I claim:

In combination, a conduit having a forked end with spaced openings in its upper wall, a float valve buoyant in a liquid movable downwardly to close one opening, a pressure release valve within that conduit movable upwardly to close the other opening and an arm having spaced portions connected to the valves and an intermediate portion pivotally supported whereby buoying upwardly of the float valve upon rise of the liquid level is augmented by the pressure of the liquid upon the pressure release valve.

AUSTIN EARLE CALKINS.